United States Patent
Ramanathan et al.

(10) Patent No.: US 7,555,534 B2
(45) Date of Patent: Jun. 30, 2009

(54) PHONETIC NAME SUPPORT IN AN ELECTRONIC DIRECTORY

(75) Inventors: Rajesh Ramanathan, Redmond, WA (US); Kristian L. M. Andaker, Redmond, WA (US); Taketoshi Yoshida, Tokyo (JP); Victor Erwin Romano, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/354,435

(22) Filed: Feb. 15, 2006

(65) Prior Publication Data

US 2007/0192440 A1   Aug. 16, 2007

(51) Int. Cl.
*G06F 15/16* (2006.01)
*G06F 7/00* (2006.01)
*G06F 17/30* (2006.01)

(52) U.S. Cl. .......................... 709/217; 709/219; 707/3
(58) Field of Classification Search ................ 709/224, 709/217; 707/3, 4; 704/4
See application file for complete search history.

(56) References Cited

U.S. PATENT DOCUMENTS

| | | | |
|---|---|---|---|
| 5,678,045 A | 10/1997 | Bettels | |
| 6,148,329 A | 11/2000 | Meyer | |
| 6,366,913 B1 | 4/2002 | Fitler et al. | |
| 6,389,386 B1 * | 5/2002 | Hetherington et al. | 704/8 |
| 6,684,185 B1 | 1/2004 | Junqua et al. | |
| 6,845,370 B2 * | 1/2005 | Burkey et al. | 707/3 |
| 6,862,610 B2 | 3/2005 | Shuster | |
| 7,092,945 B2 * | 8/2006 | Hall et al. | 707/10 |
| 7,194,506 B1 | 3/2007 | White et al. | |
| 2001/0029455 A1 | 10/2001 | Chin et al. | |
| 2001/0042118 A1 | 11/2001 | Miyake et al. | |
| 2002/0063154 A1 | 5/2002 | Hoyos et al. | |
| 2002/0099536 A1 | 7/2002 | Bordner et al. | |
| 2003/0158864 A1 | 8/2003 | Samn | |
| 2003/0182101 A1 | 9/2003 | Lambert | |
| 2003/0233353 A1 | 12/2003 | Taylor | |
| 2004/0024760 A1 | 2/2004 | Toner et al. | |
| 2004/0193595 A1 | 9/2004 | Kaminsky et al. | |

(Continued)

OTHER PUBLICATIONS

Intelligent Search Technology, Ltd, "The Intelligent Choice," http://www.intelligentsearch.com/name_searching/index.html, printed Dec. 15, 2005, 2 pages.

(Continued)

*Primary Examiner*—Larry D Donaghue
*Assistant Examiner*—Brian J Gillis
(74) *Attorney, Agent, or Firm*—Senniger Powers LLP (57) ABSTRACT

A user of a client computer submits a directory request to a server executing a server email application. The server email application is responsive to the directory request to identify a custom directory containing contact data for one or more individuals. The server email application determines whether to transfer a written form of the contact data, or whether to transfer both written and phonetic forms of the contact data to the client computer. The server email application indexes the contact data, prior to transfer, based on the written form when only the written form of contact data is being transferred to the client computer, and indexes the contact data based on both the phonetic and written forms when the written and phonetic forms of the contact data are both being transferred to the client computer.

16 Claims, 7 Drawing Sheets

U.S. PATENT DOCUMENTS

| | | |
|---|---|---|
| 2004/0267721 A1 | 12/2004 | Meyerzon et al. |
| 2005/0084152 A1 | 4/2005 | McPeake et al. |
| 2005/0091272 A1 | 4/2005 | Smith et al. |
| 2005/0144014 A1 | 6/2005 | Janke et al. |
| 2005/0204011 A1 | 9/2005 | Velayudham |
| 2006/0046768 A1* | 3/2006 | Kirbas .................... 455/550.1 |
| 2006/0168344 A1 | 7/2006 | Tsuchiya |

OTHER PUBLICATIONS

Sams, "Mac OS X Panther Applications and Utilities," http://www.samspublishing.com/articles/article.asp?p=169576, dated Apr. 9, 2004, 11 pages.

Europa Technologies, "Global Proxima," http://www.europa-tech.com/gpx.htm, dated Dec. 15, 2005, 2 pages.

Phonetic Eye, "A real practical solution to phonetic search," http://www.phoneticeye.com/new/, printed Dec. 15, 2005, 1 page.

* cited by examiner

PHONETIC NAME SUPPORT IN AN ELECTRONIC DIRECTORY

BACKGROUND

With the growth of computer and information systems and related network technologies such as wireless and Internet communications, ever increasing amounts of electronic information are communicated, transferred and subsequently processed by users and/or systems. As an example, electronic mail, text messaging, facsimile transmission, and voice mail are all popular methods for communicating such information. In particular, with the advent of the Internet, exchanging email has become an important factor influencing why many people acquire computers, and the process more and more people use to communicate and exchange information.

Conventional email applications provide users the ability to view custom directories that store email addresses, names, telephone numbers, and other contact information for individuals they frequently communicate with via email. Some conventional email applications provide a user the ability to view a sorted list of people in a directory based on the display name of the user, and provide the ability to search the directory based on the display name (e.g., first and last name), first name, or last name of a particular individual. However, in some cultures, such name data can have two forms. For example, there is a written form of the display such as shown on a business card that cannot be sorted in any reasonable fashion. There is also a "phonetic" form of the display name used to pronounce the written form, and is a type of "meta data" that goes along with the display name. For example, in Japan, the display name for most people is written using Kanji script, and the phonetic display name is written using Katakana or Hiragana script, also called Yomi or Furigana.

Since the phonetic form is the only way to spell names in these cultures, a custom directory that only displays the unpronounceable (i.e., non-phonetic) display names can make it difficult and/or time consuming for a user of the directory to locate, for example, a phone number for a particular individual listed in the directory, especially if the user does not know the spelling of the non-phonetic form of that individual's name. As a result, such directories can be inefficient for users in such cultures.

SUMMARY

Aspects of the invention allow for the storage and indexing of both written and phonetic forms of contact data in a custom address directory for one or more end users. One embodiment of the invention provides a schema for transferring both written and phonetic forms of contact data from a server to a client computer via a communication network. Other embodiments of the invention involve indexing contact data prior to transfer to client computer based on each form of the contact data to be transferred. Accordingly, both phonetic and written forms of contact data can be accessed by a user of the client computer, and, thus, the user can locate contact information for a particular individual with less difficulty, even when the user does not know how to spell that particular individual's display name (e.g., non-phonetic form).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
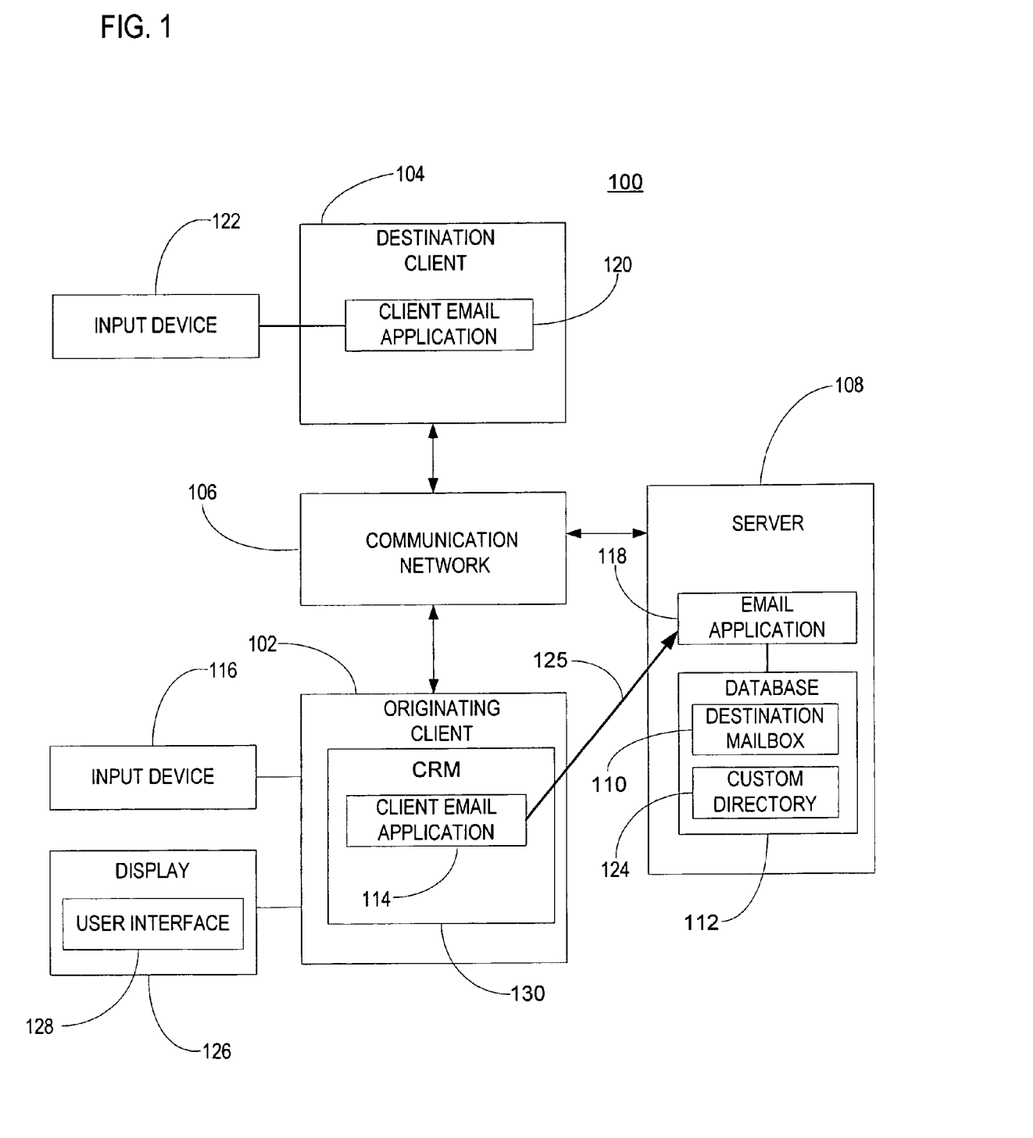
FIG. 1 is an exemplary block diagram illustrating a suitable operating environment in which embodiments of the invention may be implemented.

Referring first to FIG. 1, an exemplary block diagram illustrates a suitable operating environment 100 in which embodiments of the invention may be implemented. In this instance, FIG. 1 diagrammatically shows cross network communication between an originating client computer (originating client) 102 and a destination client computer (destination client) 104. More specifically, embodiments of the invention are described in the context of the originating computer 102 communicatively linked to a destination computer 104 such that email messages can be exchanged between the originating and destination computers 102, 104.

The originating client 102 is coupled to the destination computer 104 via a data communication network 106. In this example, the data communication network 106 is the Internet (or the World Wide Web). However, the teachings of the invention can be applied to any data communication network. A server 108 such as an email server facilitates the transfer of email messages and/or other data between a user of the originating client 102 (e.g., sender) and a user of the destination client 104 (e.g., recipient). Notably, for purposes of illustration the originating and destination clients 102, 104 are illustrated as separate client computers, but it is contemplated that the originating client 102 and destination client 104 can be the same client computer accessible to both the sender and the recipient. In this example, server 108, originating client 102, and destination client 104 communicate data among themselves using the Hypertext Transfer Protocol (HTTP), a protocol commonly used on the Internet to exchange information between clients and servers, or the Simple Mail Transfer Protocol (SMTP) commonly used for sending email messages between clients and servers.

As known to those skilled in the art, senders and recipients each have a unique address that specifies a location of a destination mailbox 110 at which to deliver email messages. For example, the destination mailbox 110 may be located in a database 112 on the server 108. The user of the originating client 102 executes an email application 114 to compose an email message for delivery to a recipient having a particular address. For example, the user of the originating client 102 enters commands and information into the email application 114 through an input device 116 such as a keyboard (e.g., wired or wireless) or a pointing device (e.g., a mouse, trackball, pen, or touch pad) to compose an email message for delivery to one or more recipients. The server 108 includes a server email application 118 that receives and stores email messages in the destination mailbox 110 for a particular addressee (e.g., recipient). A user (i.e., intended recipient) using the destination client 104 executes a client email application 120 to retrieve email messages from the destination mailbox 110. For example, the user of the destination client 104 enters commands and information into the email application 120 through an input device 122 such as a keyboard (e.g., wired or wireless) or a pointing device (e.g., a mouse, trackball, pen, or touch pad) to view a listing of received email messages and/or the contents of a particular email message.

The server email application 118 is further responsive to request from clients to create and/or update a custom directory 124 also located, for example, in the database 110. The custom directory 124 includes contact data for one or more individuals. For example, the directory 124 may include the first name, last name, email address, phone number, mailing address, job title, and employer name for one or more individuals for whom a particular user has decided to record such information. Moreover, as explained in more detail below, client email applications 114, 120 are responsive to user input to generate a directory request, as indicated by arrow 125, to retrieve contact data from the database 110. The client email applications 114, 120 are configured to display a user interface on a display (e.g., display 126) that allows the user of the client computer to view contact data included in the directory 124, search the directory 124 for a particular individual, and/or edit contact data for a particular individual. As used herein, the display name refers to the written form of the complete name of an individual (e.g., first and last name) such as might be displayed on a business card. Some cultures have two forms of the same name, a written form and a phonetic form used to help pronounce the written form. For example, as described in the Background, in Japan, the display name for most people is written using Kanji script, and the phonetic name is written using Katakana or Hiragana script, also called Yomi. However, there is no reasonable way of sorting Kanji names. Thus, if the names in a custom directory 124 are based solely on Kanji names, a directory sort is completely random for Japan and, thus, it is more difficult for Japanese users browse the directory for a particular Kanji names, or utilize a type down feature to browse list using for a Kanji name.

According to one embodiment of the present invention, the custom directory 124 is configured to store both the written and phonetic forms of contact data. For example, the custom directory 124 may include written and phonetic forms of contact data for the following name properties: first name; last name; display name; company name; and department name. Moreover, the server email application 118 is configured with a schema for retrieving and transferring written and phonetic forms of contact data to a client for display via a graphical user interface (e.g., user interface 128). As a result, the present invention provides an improved address directory that allows users to search and sort directories based on the phonetic form of a name.

The exemplary operating environment illustrated in FIG. 1 includes a general purpose computing device (e.g., client computer 102) such as a computer executing computer-executable instructions. The computing device typically has at least some form of computer readable media (e.g., CRM 130). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through the input device (e.g., input device 116). Other input devices (not shown) may be connected to the computing device. The computing device may operate in a networked environment using logical connections to one or more remote computers.

Although described in connection with an exemplary computing system environment, embodiments of the invention are operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Figure 2:
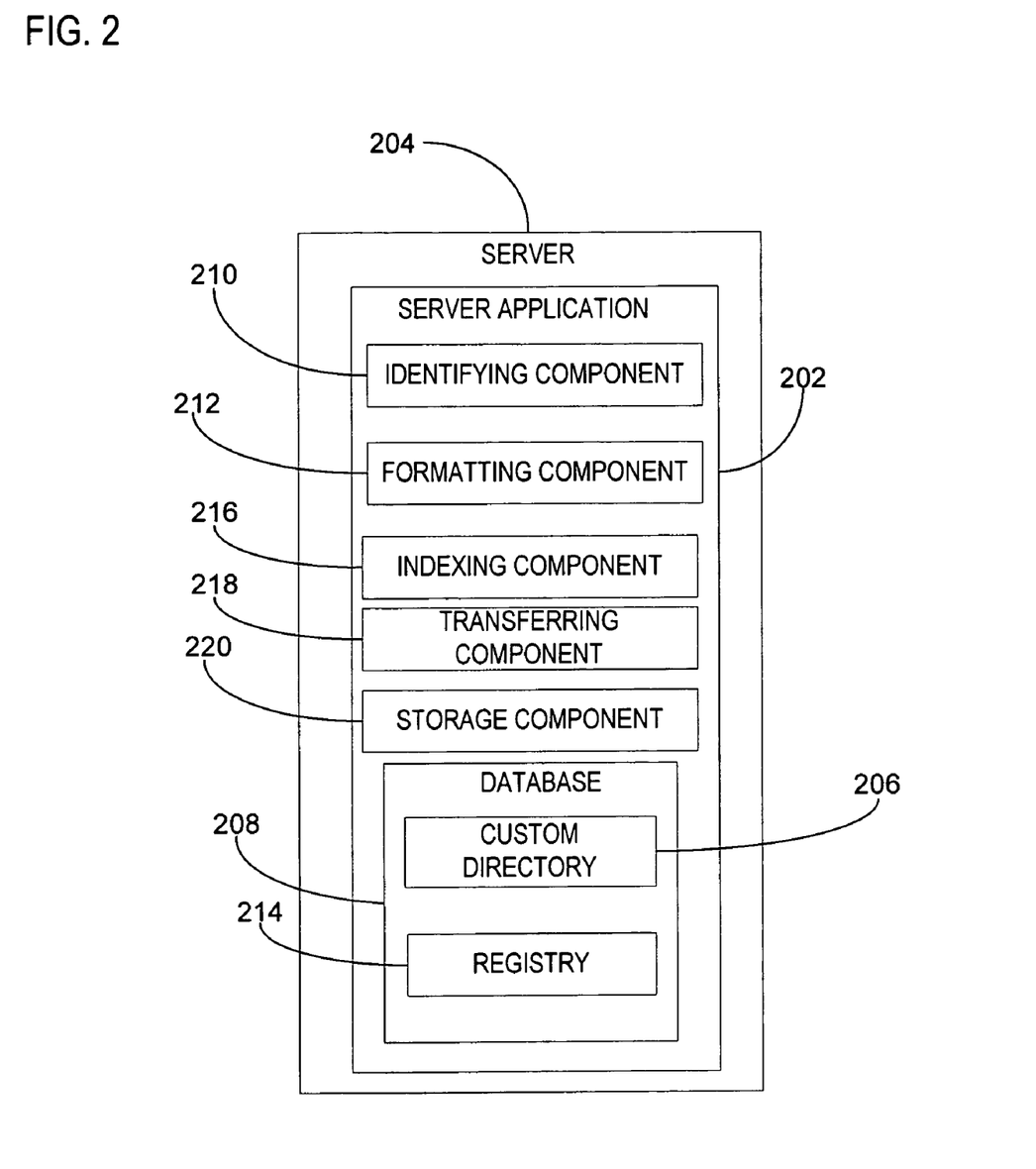
FIG. 2 is an exemplary block diagram illustrating basic components of a server email application according to one embodiment of the invention.

Referring now to FIG. 2, an exemplary block diagram illustrates basic components of a server email application 202 (e.g., server email application 118) being executed on a server 204 for facilitating cross network communication with one or more client computers according to one embodiment of the invention. In particular, the server email application 202 maintains a custom directory 206 for each of one or more client end users in a database 208. The custom directory 206 includes contact data for individuals such as business associates, friends, clients, etc of a particular client end user. As described above, contact data can include the first name, last name, email address, phone number, mailing address, job title, and employer name for business associates, friends, clients, etc. In this particular embodiment, the server email application maintains a written form and a phonetic form for various types of contact data. For example, the custom directory 206 associated with a particular client end user may include Kanji and Yomi names for display name, a first name, a last name, and an employer name for a Japanese business associate of the client end user.

An identifying component 210 is responsive to a directory request (e.g., directory request 125) received from the client to identify the custom directory 206 that corresponds to the requesting user. As described in more detail below, after particular client end user has been authenticated by via an authentication process, the user interacts with a user interface linked to the client computer to generate a directory request for contact data stored in the custom directory. Since the user is authenticated, user identification information (e.g., a user defined identification code) is transferred to the server 204 along with the directory request. In this example, the identifying component 210 identifies the custom directory that corresponds to the requesting user as a function of the received user identification information.

A formatting component 212 is responsive to the directory request received from the client to determine the formatting rules or schemas for transferring content from the identified custom directory 206 to the client computer. More specifically, the formatting component 212 determines whether content being transferred to the client includes only the written form of contact data is transferred to the requesting client, or includes both the written and phonetic forms of contact data. According to one embodiment of the invention, the formatting component 212 determines the content to transfer to client based on attribute settings in the registry 214 of the server 204. For example, if a regional attribute setting in the registry 214 indicates the server is operating or serving information in a region (e.g., Japan) where name data can be represented in both written and phonetic forms, the formatting component 212 determines that both the written (e.g., Kanji) and phonetic (e.g., Yomi) forms of the contact data will be transferred to the requesting client. Alternatively, if the regional attribute setting indicates the server 204 is operating in a region (e.g., United States) where name data is not typically represented in both written and phonetic forms, the formatting component 212 determines that only the written form of the contact data will be transferred to the requesting client computer.

According to another embodiment of the invention, the formatting component 212 determines the content of contact data to transfer to client based on a preference setting received from the client along with the directory request. As describe in more detail below, a UI form used by the client to generate a directory request can also allow the client end user to select an option to receive the phonetic form of contact data even when the regional attribute setting indicates the server 204 is operating in a region where name data is not typically represented in both written and phonetic forms.

An indexing component 216 sorts the content determined for transfer based on the regional attribute setting in the registry 214. For example, if the attribute setting in the registry of the server 204 indicates the contact data includes phonetic data, the indexing component first indexes the phonetic form of contact data based on a particular phonetic form of a particular type of the contact data (e.g., last name), and then indexes the written form of contact data based on a particular written form of the same particular type of contact data (e.g., last name). On the other hand, if the attribute setting in the registry of the server 204 indicates the contact data does not include phonetic data, the indexing component indexes the written form of contact data. The following is an example of sorting logic implemented by the indexing component 216:

```
If Phonetic Name index is requested
{
  If Phonetic display name attribute is populated
  {
    Sort by phonetic display name and then sort by Display Name;
    Return result set;
  }
  If Phonetic Name is not populated
  {
    Sort by Display Name and then sort by Display Name;
    Return result set;
  }
}
```

The above logic ensures that if the phonetic form of contact data is not populated, the object will still be returned, which is a valid scenario for multinational companies that have a divisions, manufacturing plants, or offices based in regions where phonetic names are used and based in non-phonetic regions of the world. In other words, if the phonetic form of a particular piece of contact data is absent (i.e., empty), the phonetic form of that piece of data is still sorted alongside the corresponding written form name counterparts.

The following tables illustrate examples of non-sorted written and phonetic name values and the same written and phonetic name values after being sorted, or indexed, by the indexing component when the attribute settings in the registry of the server indicates the contact data includes phonetic data. For purposes of the following examples, the relationship of the illustrated values is defined as A<B, 1<9 and 1<A:

TABLE 1

NON SORTED Example 1

| Object # | Phonetic Name value | Display Name value |
|---|---|---|
| 1 | 1 | B |
| 2 | 1 | A |

TABLE 2

SORTED Example 1

| Object # | Phonetic Name value | Display Name value |
|---|---|---|
| 2 | 1 | A |
| 1 | 1 | B |

TABLE 3

NON SORTED Example 2

| Object # | Phonetic Name value | Display Name value |
|---|---|---|
| 1 | 2 | A |
| 2 | 1 | B |
| 3 | 1 | C |

TABLE 4

SORTED Example 2

| Object # | Phonetic Name value | Display Name value |
|---|---|---|
| 2 | 1 | B |
| 3 | 1 | C |
| 1 | 2 | A |

TABLE 5

NON SORTED Example 3

| Object # | Phonetic Name value | Display Name value |
|---|---|---|
| 1 | 1 | A |
| 2 | (blank) | B |
| 3 | 2 | C |
| 4 | D | D |

TABLE 6

SORTED Example 3

| Object # | Phonetic Name value | Display Name value |
|---|---|---|
| 1 | 1 | A |
| 3 | 2 | C |
| 2 | (blank) → B | B |
| 4 | D | D |

TABLE 7

NON SORTED Example 4

| Object # | Phonetic Name value | Display Name value |
|---|---|---|
| 1 | 1 | A |
| 2 | (blank) | B |
| 3 | 2 | E |
| 4 | 3 | C |
| 5 | D | B |
| 6 | (blank) | C |

TABLE 8

SORTED Example 4

| Object # | Phonetic Name value | Display Name value |
|---|---|---|
| 1 | 1 | A |
| 3 | 2 | E |
| 4 | 3 | C |
| 2 | (blank)→B | B |
| 6 | (blank)→C | C |
| 5 | D | B |

As can be seen from Tables 1 and 2, when the value of phonetic data for at least two objects (e.g., contact data for two different business associates) is the same, the indexing component sorts the contact data according to the written form of the display name. From Tables 3 and 4 it can be seen that the indexing component assigns sorting priority to the phonetic name value over the written name value. For example, although the written name value of A is less than the written name value of C, since the phonetic value 1 is less than the phonetic value 2, the indexing component sorts the data shown in Table 3 such that the written name value of C is listed prior to the written name value of A in Table 4. Tables 5 thru 8 illustrate the when the phonetic form of contact data is absent, the indexing component assigns the written name value to the phonetic name value, and then sorts the data as previously described.

A transferring component 218 transfers the indexed form or forms of the form or forms determined for transfer by the formatting component 212.

Figure 3:
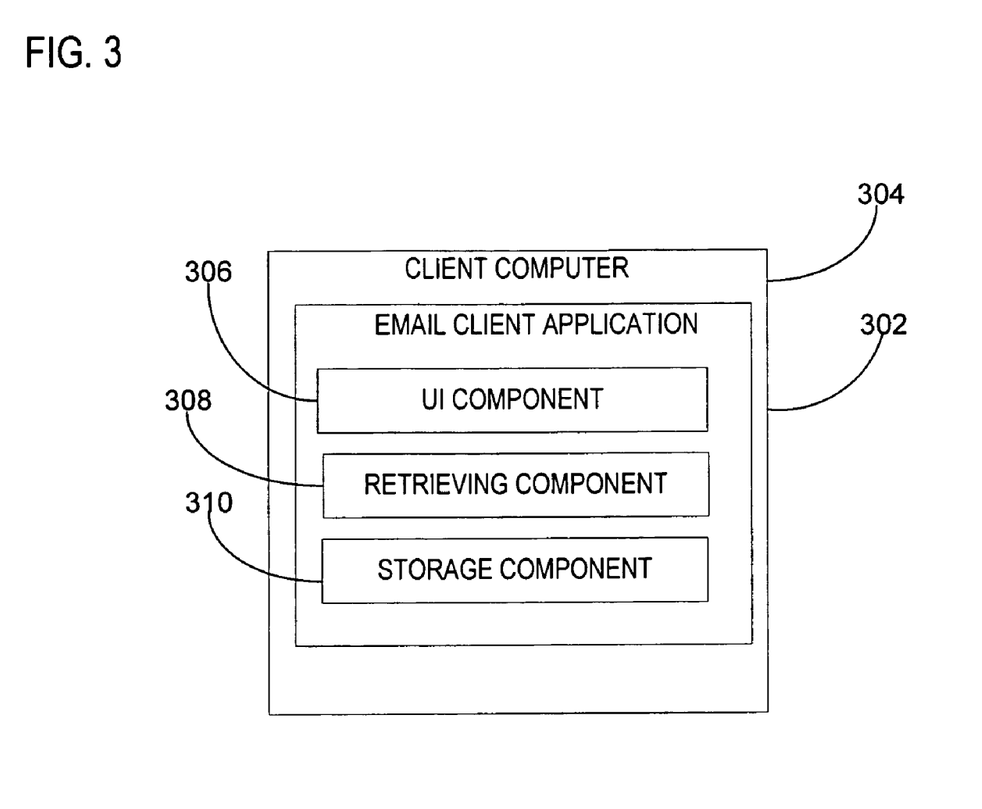
FIG. 3 is an exemplary block diagram illustrating basic components of a client email application according to one embodiment of the invention.

Referring now to FIG. 3, an exemplary block diagram illustrates basic components of a client email application 302 (e.g., server email application 118) being executed on a client computer 304 for facilitating cross network communication between a client and a server according to one embodiment of the invention. As described above, the client email application 302 allows the user to compose and send email messages to a destination mailbox of a particular party having a particular address on the network. Moreover, the client email application 302 is responsive to user input to communicate with a server to allow the user to view contents of a custom directory (e.g., custom directory 206) being maintained on the server. In one exemplary embodiment, the email application 302 automatically creates a data entry in the custom directory for each new email address (e.g., recipient) to which the user sends an email message. Thereafter, the user can interact with user interface forms to define additional contact information for each of the recipients, or modify existing contact data for each of the recipients.

Figure 4:
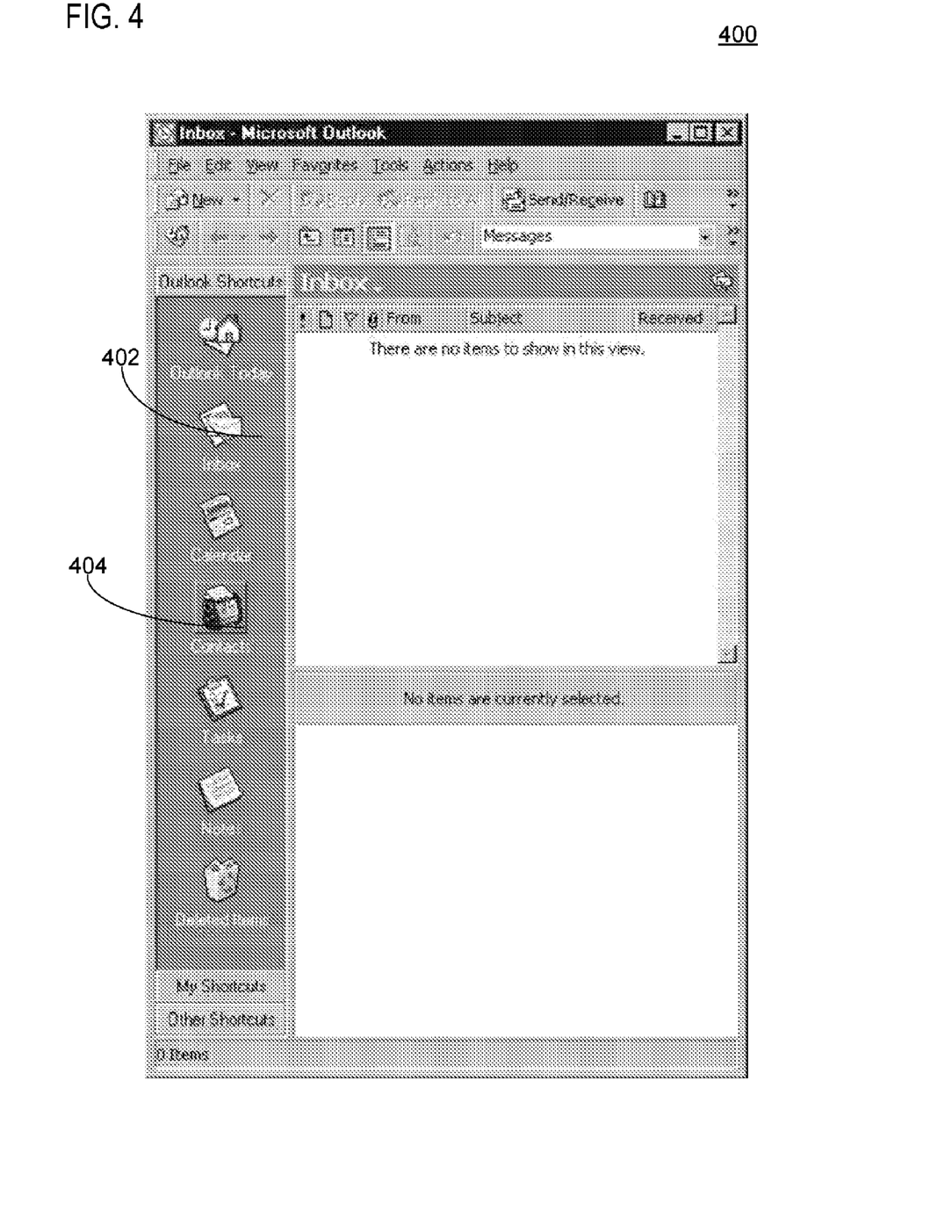
FIG. 4 is a screen shot of exemplary user interface for interacting with a client email application according to one embodiment of the invention.

After the user executes the client email application 304 and has successfully completed an authentication process (e.g., submits correct user identification and/or password data), to access a particular email server (e.g., server 204), or an associated authentication server (not shown), a user interface component 306 displays a graphical user interface that includes various controls the user selects to interact with the email application. Referring briefly to FIG. 4, there is shown a screen shot of an exemplary user interface (UI) 400 displayed to the user after successfully completing authentication process. As can be seen the, the UI 400 includes various controls that are responsive to user input to display different UI forms to the user for performing desired functions. For example, the UI includes an inbox control 402 responsive to user input (e.g., mouse click) to display email messages received by the server and addressed to the user. The UI also includes a directory, or address book, or contacts control 404 that the user selects to retrieve contact data from the server. According to one embodiment of the invention, the UI also includes a phonetic option control (e.g., check box control) that the user selects, or enables, to indicate whether the phonetic form of contact data is desired. For example, by selecting the check box control a status of a flag value is changed from a default value null value (i.e., 0) to a value equal to 1. This flag value is transferred along with the directory request to the server. Referring again to FIG. 2, if the server email application 202 determines that flag value is equal to one (1,) transferring component 218 transfers the written and phonetic forms of the contact data to the client computer even when the regional attribute indicates the server is not serving a region in which the contact data has written and phonetic forms.

Figure 5:
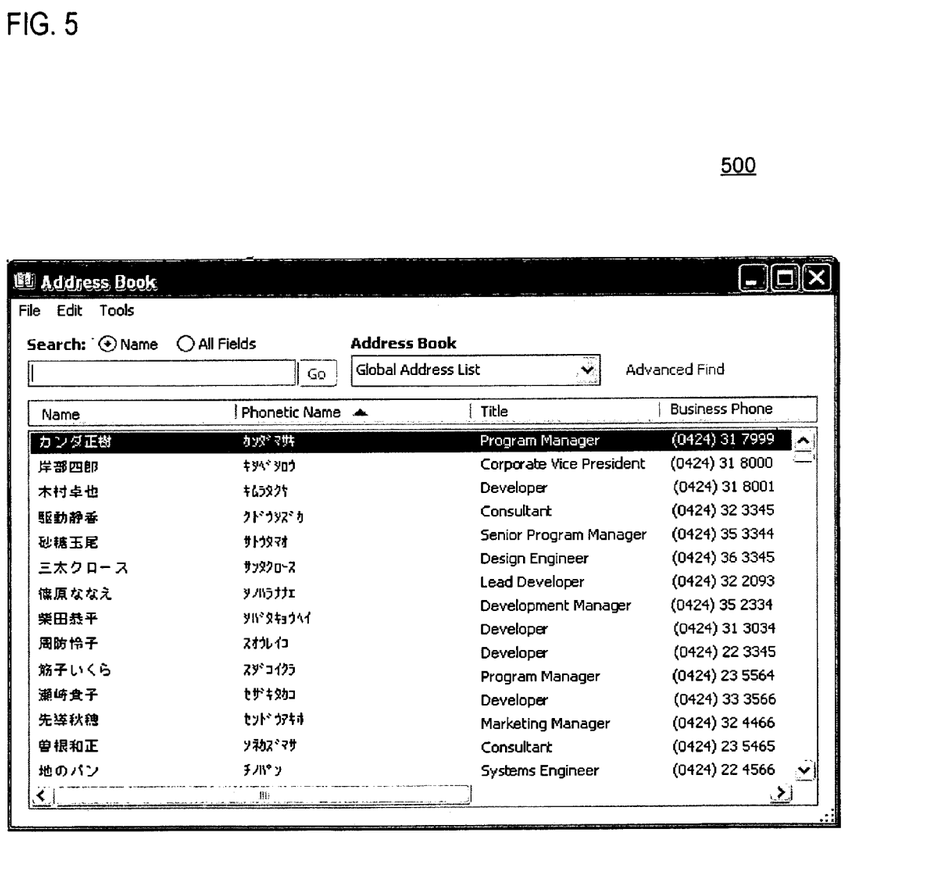
FIG. 5 is a screen shot of an exemplary custom directory form viewing contact data according to one embodiment of the invention.

Referring now back to FIG. 3, a retrieving component 308 is responsive to user input (e.g., user selecting the contacts control 404) to generate a directory request (e.g., directory request 125) for submission to the server. The directory request includes user identification information and any data preferences (e.g., phonetic contact data desired). As described above in reference to FIG. 2, the server email application 202 is responsive to a received directory request to identify the custom directory 206 associated with the particular user identification information, and transfers the appropriate contact data to the client computer. The UI component 306 displays transferred contact data via a custom directory UI form 500 such as shown in FIG. 5 that allows the user to view both written and phonetic form of contact data. Moreover, the user can interact with the custom directory UI form to modify and/or edit the contact data.

Figure 6:
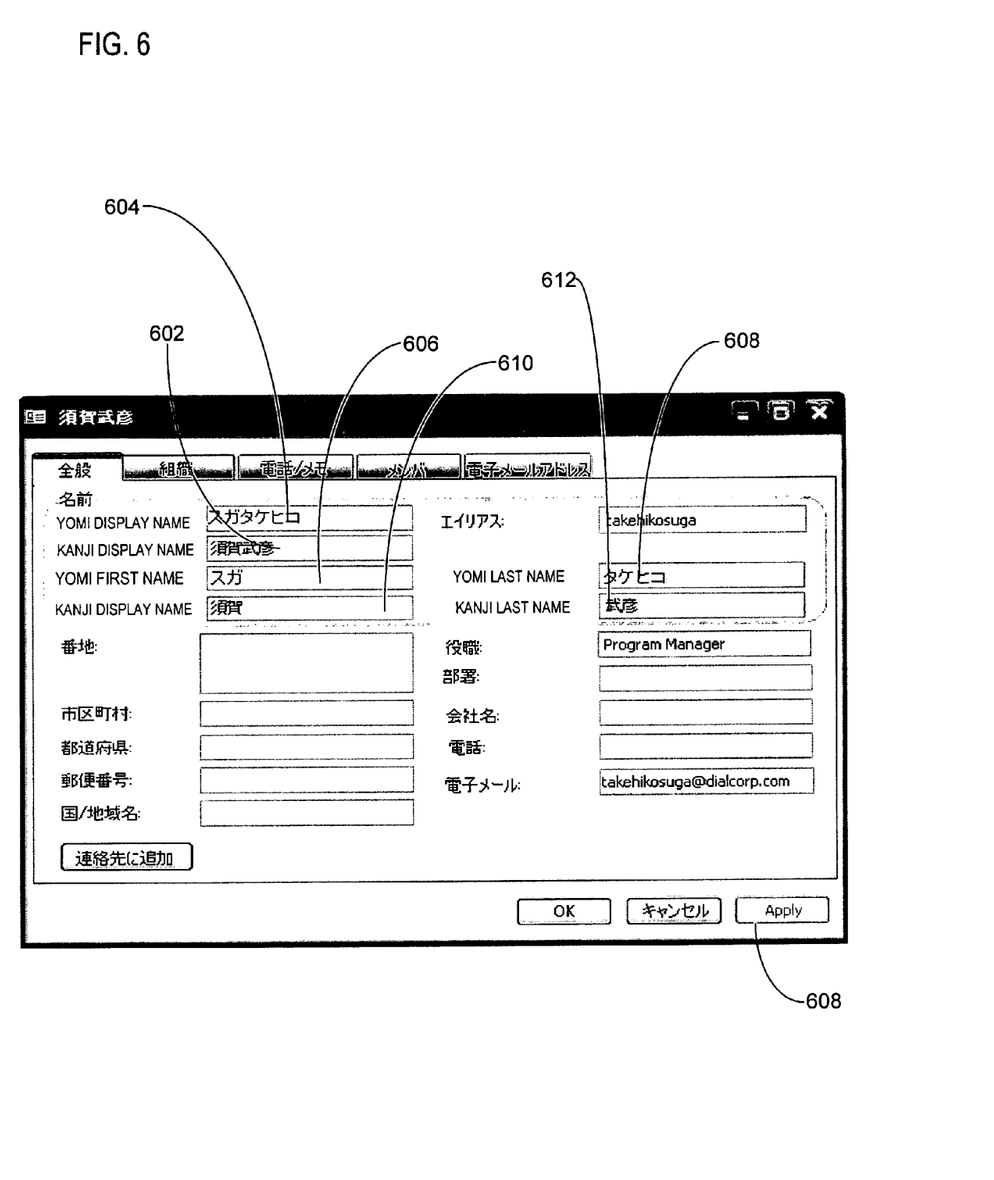
FIG. 6 is a screen shot of an exemplary contact data form for adding or editing contact data for storage in a custom directory according to one embodiment of the invention.

Referring now to FIG. 6, there is shown a screen shot of an exemplary contact data form 600 that allows the user to edit contact data for storage in the custom directory 206 on the server. The contact form 600 allows the user to define a written form and a phonetic form for various types of contact data. For example, if the user desires to enter phonetic contact information for a Japanese business associate for which the written form (i.e., Kanji) of the display name is known, as indicated by 602, the user can use the contact form 600 to define a Yomi display name, as indicated by reference character 604, a Yomi first name, as indicated by reference character 606, and a Yomi last name, as indicated by reference character 608. The Kanji first name and Kanji last name are indicated by reference characters 610 and 612, respectively. After defining contact data via contact data form 600 the user selects, for example, an apply control 608 to modify contact data stored in the custom directory of the server.

Referring back to FIG. 3, a client storage component 310 is responsive to user input indicating a desire to add/or modify contact data (e.g., user selecting the apply control 608 on the contact data form 600) to transfer the added/modified contact data to the server email application for storage. The server email application 204 (see FIG. 2) is responsive to the defined contact data to update and/or modify the contact data stored in the custom directory. In particular, a server storage component 220 adds the defined contact data to the custom directory if it corresponds to new email address and replaces existing contact data if it corresponds to an existing email address.

Figure 7:
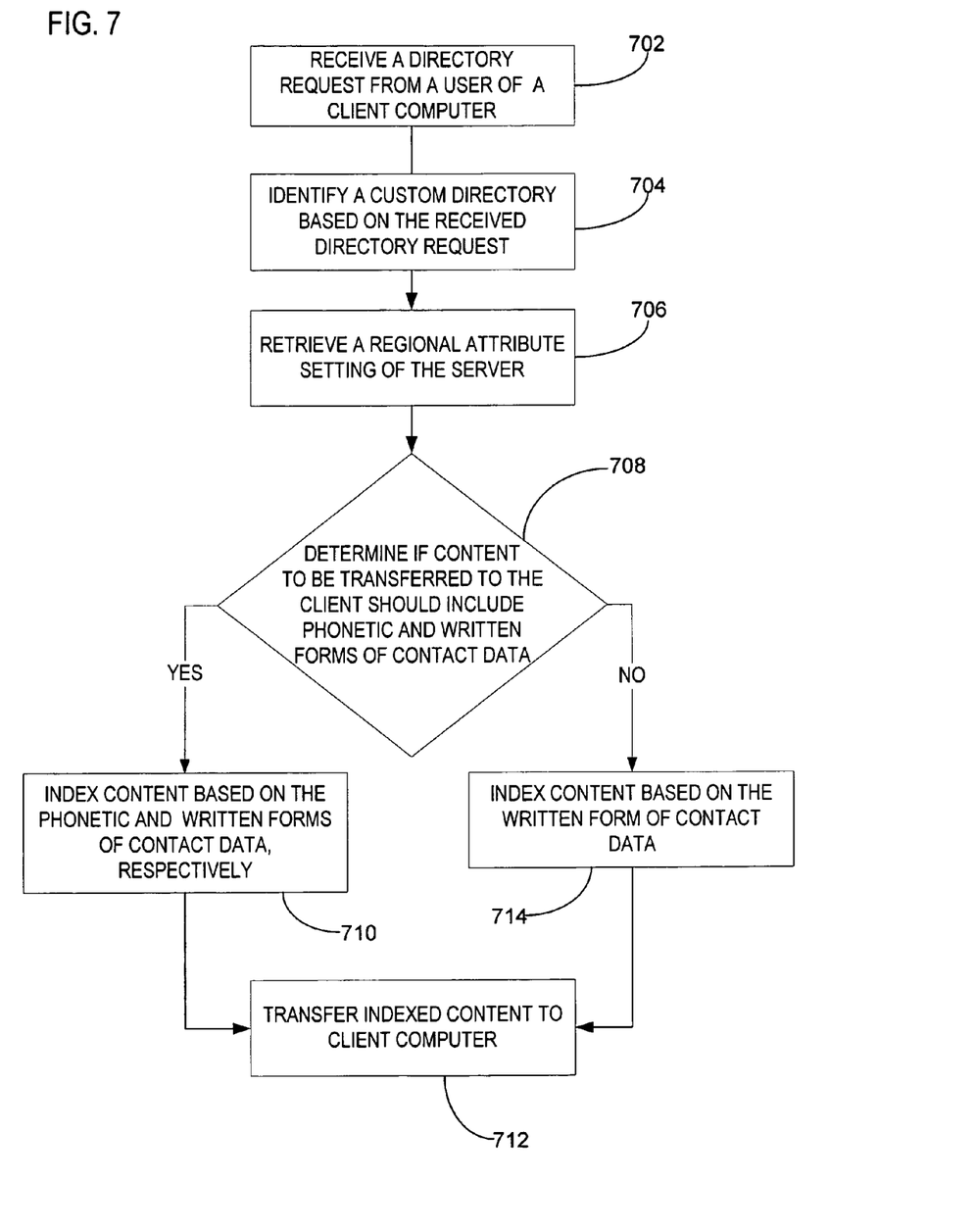
FIG. 7 is an exemplary flow chart illustrating a method for transferring contact data from a server to a client computer according to one exemplary embodiment of the invention.

Referring now to FIG. 7, an exemplary flow chart illustrates a method for transferring contact data from a server to a client computer according to one exemplary embodiment of the invention. A directory request is received from a user of the client computer at 702. As described above, the directory request includes user identification information. At 704, the server application is responsive to the received directory request to identify a custom directory that corresponds to the requesting user. The custom directory includes contact information such as an email address, first name, last name, and a job title for each of one or more individuals. The server application retrieves a value of a regional attribute setting from the system registry of the server at 706. The server application determines the content of the contact data to transfer to the client computer as a function of the value of the retrieved regional attribute setting at 708. If the determined value of the regional attribute setting indicates the server is operating in a region in which contact data has a written form and a phonetic form at 708, the determined content is indexed based on the phonetic form of the contact data and then indexed based on the written form at 710. The indexed content including written and phonetic forms of contact data is transferred to the client at 712. Alternatively, if the determined value of the regional attribute setting does not indicate the server is operating in a region in which contact data has a written form and a phonetic form at 708, the determined content is indexed based on the written form at 714. The indexed content including only the written form of the contact data is transferred to the client at 712.

In operation, computer 304 and server 204 executes computer-executable instructions such as those illustrated in the figures to implement embodiments of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of embodiments of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method implemented by a computing device for transferring contact data from a server to a client computer via a communication network, said method comprising:

receiving, at the server, a directory request from a user of the client computer, said directory request including user identification data for the user of the client computer;

identifying a custom directory corresponding to the user identification data, said custom directory including the contact data for individuals stored by the user, said contact data having at least a first form and a second form, wherein the first form of contact data corresponds to a written form and the second form of contact data corresponds to a phonetic form;

determining a content of the contact data to transfer to the client computer as a function of a regional attribute of the server; and transferring the determined content of the contact data to the client computer, wherein the transferring includes transferring only the first form of the contact data when the regional attribute does not indicate the server is serving a region in which contact data has the first form and the second form, and wherein the transferring includes transferring the first and second forms of contact data when the regional attribute indicates the server is serving the region in which the contact data has the first form and the second form.

2. The method of claim 1 further comprising:

indexing the content, prior to transferring, based on the first form of the contact data when the regional attribute does not indicate the server is serving the region in which the contact data has a first form and a second form;

indexing the content, prior to transferring, based on the second form of contact data when the regional attribute indicates the server is serving the region in which the contact data has the first form and the second form; and wherein the transferring includes transferring the indexed content to the client computer.

3. The method of claim 2, the indexing includes first indexing the determined content based on the second form of the contact data, and second indexing the determined content based on the written form of the contact data when the regional attribute indicates the server is serving the region in which the contact data has the written form and the phonetic form.

4. The method of claim 2, wherein the directory request further includes user preference data, said user preference data indicating whether the user desires to transfer only the first form of the contact data to the client computer, or whether the user desires to transfer the first form and the second form of the contact data to the client computer.

5. The method of claim 4, wherein the user preference data defines a status of a flag associated with the client computer, and wherein the flag has a first status by default that indicates the user desires to retrieve only the first form of the contact data, and wherein the flag has a second status set by the user to indicate the user desires to retrieve the first form and second form of the contact data.

6. The method of claim 5, wherein the user preference data overrides the regional attribute when the flag has the second status such that the first and second forms of the contact data are transferred to the client computer when the regional attribute indicates the server is not serving the region in which the contact data has first and second forms.

7. The method of claim 1, wherein the contact data includes a first form and a second form for at least one or more of the following:
 a display name;
 a first name;
 a last name;
 a job title; and
 an employer name.

8. One or more computer-readable storage media having computer executable components executed by a computing device for transferring contact data to a client application for processing in response to a directory request received from a user of a client computer executing the client application, said directory request including user identification data for the user of the client computer, said computer-readable media comprising:
 an identifying component responsive to the directory request for identifying a custom directory corresponding to the user identification data, said custom directory including contact data of individuals stored by the user, said contact data having at least a written form and a phonetic form;
 a formatting component for determining a content of contact data to transfer to the client application as a function of a regional attribute associated with the computing device; and
 a transferring component for transferring the determined content of contact data to the client computer, wherein the transferring component only transfers the written form of the contact data when the regional attribute does not indicate the server is operating in a region in which the contact data has the written form and the phonetic form, and wherein the transferring component transfers the written form and the phonetic form of the contact data when the regional attribute indicates the server is operating in the region in which the contact data has the written form and the phonetic form.

9. The computer-readable storage media of claim 8 further comprises an indexing component for indexing the determined content of contact data as a function of the regional attribute associated with the computing device, and wherein the transferring component transfers the indexed content to the client application for display to the user.

10. The computer-readable storage media of claim 9, wherein the indexing component indexes the determined content based on the written form of the contact data when the regional attribute does not indicate the server is operating in the region in which the contact data has the written form and the phonetic form, and wherein the indexing component first indexes the determined content based on the phonetic form of the contact data and second indexes the determined content based on the written form of the contact data when the regional attribute indicates the server is operating in the region in which the contact data has the written form and the phonetic form.

11. The computer-readable storage media of claim 8, wherein the directory request further includes user preference data, said user preference data overriding the regional attribute to indicate whether the user desires to transfer only the written form of the contact data to the client computer, or whether the user desires to transfer the written and phonetic forms of the contact data to the client computer.

12. The computer-readable storage media of claim 11, wherein the user preference data defines a status of a flag associated with the client computer, and wherein the flag has a first status by default that indicates the user desires to retrieve only the written form of the contact data and wherein the flag has a second status set by the user to indicates the user desires to retrieve the written and phonetic forms of contact data.

13. The computer-readable storage media of claim 8, wherein the contact data for the user includes written and phonetic forms for at least one or more of the following:
 a display name;
 a first name;
 a last name;
 a job title; and
 an employer name.

14. The computer-readable storage media of claim 8 further comprises a storage component that is responsive to a storage request received from the user of the client computer for adding contact data to the identified custom directory or modifying contact data included in the identified custom directory.

15. A system for transferring contact data between a server and a client computer via a communication network, said system comprising:
 an user interface, associated with the client computer, for generating a directory request in response to input from a user, said directory request including user identification data for the user of the client computer,
 a processor, associated with the server, for executing computer-executable instructions for:
  identifying a custom directory corresponding to the user identification data, said custom directory including contact data of individuals stored by the user, said contact data of the user having at least a written form and a phonetic form;
  determining a content of the contact data to transfer to the client application as a function of a regional attribute associated with the computing device, said regional attribute indicating whether the server is operating in a region in which the contact data has a written form and a phonetic form;
  indexing the content to be transferred as a function of the regional attribute associated with the computing device, wherein indexing the determined content is based on the written form of the contact data when the regional attribute does not indicate the server is operating in a region in which the contact data has the written form and the phonetic form, and wherein the indexing includes first indexing the determined content based on the phonetic form of the contact data and second indexing the determined content based on the written form of the contact data when the regional attribute indicates the server is operating in the region in which the contact data has the written form and the phonetic form; and transferring the indexed content to the client computer, wherein the transferring includes transferring only the written form of the contact data when the regional attribute does not indicate the server is serving a region in which contact data has the written form and the phonetic form, and wherein the transferring includes transferring the written and phonetic forms of contact data when the regional attribute indicates the server is serving the region in which the contact data has the written form and the phonetic form; and wherein the user interface, associated with the client computer, further displays the indexed content.

16. The system of claim 15, wherein the user interface is responsive to user input to define a data preference, said data preference indicating whether the user desires to retrieve only the written form of the contact data, or whether the user desires to retrieve the written and phonetic forms of the contact data, and wherein the processor determines the content of the contact data to transfer to the client computer as a function of the defined data preference.

* * * * *